Patented Apr. 8, 1952

2,592,509

UNITED STATES PATENT OFFICE 2,592,509

NONCRYSTALLIZING LACTOSE SIRUP AND METHOD OF MAKING

Richard J. Block, Scarsdale, N. Y., assignor to The Borden Company, a corporation of New Jersey No Drawing. Application July 13, 1950, Serial No. 173,697

5 Claims. (Cl. 127—30)

This invention relates to a lactose syrup and the method of making it.

Lactose is well known to be a desirable ingredient of ice cream, certain formulas for infant feeding, and other food products in which it is not now used extensively. The difficulty that arises is due in part at least to the relatively low solubility of this sugar in water as compared to that of other sweetening agents; lactose in even relatively low concentrations crystallizes from solutions at low temperatures. Thus lactose is soluble to the extent of only approximately 17 parts by weight in 100 parts of cold water, whereas sucrose, maltose and dextrose are soluble to the extent of 179, 108, and 83 parts, at temperatures of 0°, 25°, and 17° C., respectively.

We have now discovered a method of making lactose syrups of high concentration and freedom from crystallization on standing at ordinary temperatures.

In general, the method of our invention includes partial hydrolysis of an aqueous solution of lactose by contact with warm water and an ion exchange resin and then evaporating the resulting solution to concentration desired, as, for instance, to a syrup containing 50 to 75 parts of total sugars to 100 parts of water.

In this manner, we are able to obtain non-crystallizing syrup containing up to 35 parts or more of lactose for 40 parts of water without crystallizing at temperatures as low as 4° C. Such concentrated non-crystallizing syrups contain also substantial proportions of other sugars resulting from the hydrolysis of lactose.

Our invention comprises, in addition, the herein described lactose, dextrose and galactose syrup resulting from the hydrolysis of lactose and concentration of the resulting solution.

As the lactose used as the starting material to be partially hydrolyzed, we may use any grade of commercial lactose. For a long cycle of operation, we use lactose which is low in ash and low in nitrogen content.

The lactose selected for use is first dissolved in water to give a solution, as for instance, a 5% to 15% solution and normally about 10%. When warm water is used to effect the solution and the solution is subsequently kept warm, concentrations as high as 30% or approximate saturation may be employed.

The lactose solution is then contacted with an ion exchange resin adjusted to the hydrogen cycle.

The resin used is a sulfonated product that is aldehyde-inert, that is, inert chemically to the acetaldehyde group of lactose, dextrose, and galactose. Examples of resins that are satisfactory for our purpose are the cation exchangers of the class sulfonated phenol formaldehyde condensation products, sulfonated coal, and sulfonated polystyrenes. Representatives of these three classes of resins are available under the names Duolite C-1, Duolite C-3, Amberlite IR–100 which are examples of the sulfonated phenolic formaldehyde resins; Zeo-Karb, illustrating the sulfonated coal type; and Liquonex CRW which is an example of the sulfonated polystyrene cation exchanger.

The selected resin, before contact with the solution of lactose, is adjusted to the hydrogen cycle as by treatment with dilute mineral acid followed by washing with water in usual manner. The same resin, after long use and in the spent condition, is regenerated by similar acid treatment and washing, to restore it to the hydrogen cycle.

The effect of the treatment in increasing the proportion of lactose that may be dissolved and remain in solution for 100 g. water is shown by the following preparations:

Twenty-five grams of Duo-lite C-3 in the hydrogen cycle was placed in a three neck flask with a stirrer thermometer and reflux condenser attached. 500 ml. of a hot 30% solution of purified Borden's beta-lactose were added. The stirrer was run for two minutes and an aliquot of the lactose solution removed. Sample 1. Flame was then started and the lactose hydrolyzed at 100° C. under reflux. Aliquots were removed every 30 minutes. Samples 2 to 6 inclusive.

The percent hydrolysis of lactose was determined on each sample. The following results were obtained:

| Sample No. | Time of Heating (Minutes) | Percentage Hydrolysis | Lactose Remaining Percent of Solution |
|---|---|---|---|
| 1 | 0 | 0 | 30 |
| 2 | 30 | 14 | 25.8 |
| 3 | 60 | 20 | 24 |
| 4 | 90 | 34 | 19.8 |
| 5 | 120 | 49 | 15.3 |
| 6 | 150 | 100 | 9 |

Each of these solutions was then concentrated to a syrup corresponding to 60 initial concentration of lactose. Half of each solution was allowed to remain at room temperature, other half at 4° C. for 20 days.

Both at room temperature and at 4° C., small amounts of crystals were seen in sample Nos. 1–4

(34% hydrolysis) but no trace of crystals in sample Nos. 5 and 6 (49% hydrolysis). It is considered that no crystals would have been seen at 40% hydrolysis. It should be recalled that the solubility of lactose in the cold is 17 grams per 100 cc. This is much lower than the indicated solubility.

To explain the indicated increase in solubility of the lactose, synthetic mixtures of sugars resulting from the resin treatment were made in aqueous solutions of the following compositions:

| Sample No. | Sugar and Concentration of Aqueous Solution Used— | |
|---|---|---|
| | Lactose 60% | Dextrose and Galactose 30% and 30% |
| 1 | 100 | 0 |
| 2 | 90 | 10 |
| 3 | 80 | 20 |
| 4 | 70 | 30 |
| 5 | 60 | 40 |
| 6 | 50 | 50 |
| 7 | 40 | 60 |
| 8 | 30 | 70 |
| 9 | 20 | 80 |
| 10 | 10 | 90 |
| 11 | 0 | 100 |

Portions of the mixed solutions were kept at room temperature and others at 4° C. Crystals were seen in the mixture containing 70% lactose and 30% of its hydrolytic products. No crystals were seen either at room temperatures or in the cold at 40% hydrolysis after 6 days.

It appears from the data above that the products of lactose hydrolysis, namely dextrose and galactose, aid in the prevention of crystallization in lactose.

The invention will be further illustrated by description in connection with the following specific examples:

EXAMPLE 1

One hundred grams of purified beta-lactose and 1 liter of water were placed in a vessel equipped with a stirrer and refluxed for 30 minutes with 40 grams of a sulfonated phenolformaldehyde resin which is sold under the trade name of Duolite C-3. The resin was used in the hydrogen cycle. At the beginning of the reaction, the pH was 3.0 and at the end the pH was 2.7. The per cent conversion after refluxing for 30 minutes was about 15 per cent hydrolysis of the original material. The resulting solution, containing the dextrose, galactose, and lactose, was filtered from the catalyst, was colorless, ashless, and free from objectionable taste.

EXAMPLE 2

Two hundred grams of purified alpha-lactose were dissolved by boiling in 1 liter of water, and 25 grams of Duolite C-3 in the hydrogen cycle were added. The solution was boiled for 3½ hours under reflux while stirring. At the beginning of the reaction the pH was 3.0 and at the end 2.7. The degree of hydrolysis was 75 per cent. The resulting solution of conversion products and residual lactose was filtered to remove the catalyst. The colorless solution was ash-free and had no objectionable taste.

EXAMPLE 3

One hundred grams of crude lactose containing 1 per cent moisture, 0.06 per cent nitrogen, and 0.3 per cent ash were dissolved by heating in 500 ml. of water. The solution, containing a trace of undissolved material, was yellow and had a pH of 6.1. 100 grams of Duolite C-3 in the hydrogen cycle were added and the lactose was completely hydrolyzed by gentle boiling, under reflux, for 3½ hours. During the heating period the solution was mechanically stirred to prevent bumping and burning. The pH of the solution immediately after adding the catalyst was 3.5. After standing at room temperature for one hour the pH dropped to 3.1. At the end of the 3½ hour hydrolysis, the pH was 2.6–2.7. After complete hydrolysis the sugar solution was completely colorless and ash-free and had no objectionable taste.

One of the advantages of this process using cation-exchange resins as the catalyst over a hydrolysis with mineral acids is that such procedures require the use of acid which subsequently must be removed or neutralized. In the process of the present invention, there is practically no change in pH from the beginning of the reaction through the end of the hydrolysis. This process results in a saving in the cost of labor by the elimination of one whole operation, that is, neutralizing the acid which would be employed in the ordinary or usual process.

Another advantage is that the use of a cation-exchange resin as the catalyst in the hydrolysis of lactose eliminates the formation of side reactions during hydrolysis which result in discoloration of the material and hence necessitate a further purification step to remove the off-color materials.

Different degrees of hydrolysis of the lactose were obtained by varying the amount of resin used, as shown in the following table. In each instance, 100 grams of beta-lactose and 1 liter of water were boiled under reflux for 30 minutes with the varying amounts of Duolite C-3 indicated.

*Table 1*

| Grams Duolite C-3 | pH At End of Reaction | Per Cent Hydrolysis |
|---|---|---|
| 10 | 3.0 | 7 |
| 20 | 3.0 | 8 |
| 40 | 3.0 | 15 |
| 60 | 2.9 | 25 |
| 80 | 2.7 | 27 |
| 160 | 2.7 | 51 |

The degree of hydrolysis was also found to vary with the time of heating when the amount of resin used remained constant, as shown in the following table. In each instance 200 grams of beta-lactose, 1 liter of water, and 25 grams of Duolite C-3 were heated over a free flame under reflux, with stirring, for varying lengths of time.

*Table 2*

| Time of Heating (hours) | Per Cent Hydrolysis |
|---|---|
| 2.0 | 62 |
| 3.5 | 75 |
| 4.5 | 82 |

Still another advantage resides in the fact that there is substantially no ash formed during the reaction and, in fact, by the use of these resins any traces of ash and nitrogenous impurities which may be present are removed. This process, therefore, has the advantage of not requiring a de-ashing step.

As used in the process of this invention, the resin has a very high conversion capacity since the resin functions as a true catalyst and not as an adsorbing agent. The life of the catalyst before regeneration is limited by the amount of residual ash contained in the lactose since in the presence of ash the catalyst acts as an adsorbing agent and is eventually depleted and must then be subjected to a regeneration procedure.

The mixture of sugars formed by the process of the present invention presents a much greater solubility than the original lactose. Ordinary lactose is difficultly soluble (17 grams per 100 ml. of cold water) in water and its ready solution is accomplished only by the aid of heat. This makes it difficult to handle. The concentration of a saturated solution at ordinary temperatures is relatively low. The hydrolyzed syrup makes an excellent carrier for lactose.

This syrup may be used in ice cream and in other uses for which lactose and other sugars are employed. It also may be used in modifying baby formulas, in baking, in confectionery, and other food uses which will be apparent to those skilled in the art.

It is not necessary in all instances to have 100 per cent hydrolysis of the lactose. We have found that only 20 per cent hydrolysis will be sufficient to hold the remaining lactose in solution without heating it and will also prevent crystallization or settling out of a saturated solution, the theory being that the hydrolyzed particles prevent the unhydrolyzed crystals from coming together by forming a coating around the unhydrolyzed crystals.

It will be understood that it is intended to cover all changes and modifications of the examples of the invention herein chosen for the purpose of illustration which do not constitute departures from the spirit and scope of the invention.

What is claimed is:

1. An aqueous syrup containing lactose in concentration substantially above the normal saturation proportion but in non-crystallizing condition, the lactose being associated with dextrose and galactose in the proportion of at least about 40% of the dextrose and galactose together on the weight of the lactose and the dextrose and galactose being present in approximately equal proportions.

2. In making a lactose syrup containing lactose in proportion substantially in excess of the normal saturation proportion but in non-crystallizing condition, the method which comprises forming an aqueous solution of lactose, contacting the solution with a sulfonated ion exchange resin adjuster to the acid cycle, maintaining the contact at elevated temperature not above the boiling point of the solution unil approximately 40% of the original lactose is hydrolyzed to dextrose and galactose, then discontinuing the hydrolysis, and concentrating the resulting solution to a syrup.

3. The method described in claim 2, the ion exchange resin being sulfonated phenolaldehyde condensation product.

4. The method described in claim 2, the ion exchanged resin being sulfonated coal.

5. The method described in claim 2, the ion exchange resin being sulfonated polystyrene.

RICHARD J. BLOCK.

REFERENCES CITED

The following references are of record in the file of this patent:

UNITED STATES PATENTS

| Number | Name | Date |
|---|---|---|
| 2,534,694 | Blann | Dec. 19, 1950 |

OTHER REFERENCES

Sussman, Ind. & Eng. Chem., December 1946, pp. 1228–1230.

Englis et al., Ind. & Eng. Chem., July 1942, pp. 864–867.

Clark, "preparation of Galactose," Bureau of Standards Sci. Paper, #416, pp. 227–229, 1921.